(12) United States Patent
Iwasaki

(10) Patent No.: US 6,979,144 B2
(45) Date of Patent: Dec. 27, 2005

(54) OPTICAL PART LINKAGE DEVICE AND OPTICAL MODULE USING THE SAME

(75) Inventor: Masanori Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/928,680

(22) Filed: Aug. 13, 2001

(65) Prior Publication Data

US 2002/0089176 A1    Jul. 11, 2002

(30) Foreign Application Priority Data

Aug. 16, 2000    (JP)    ............................ P2000-247053

(51) Int. Cl.$^7$ ................................................ G02B 7/02
(52) U.S. Cl. ...................... 403/359.6; 403/4; 396/533; 359/822
(58) Field of Search ........................... 403/359.6, 3, 4, 403/48, 348, 350, 359.5, 359.3, 360, 374.3; 396/531, 533, 529, 530; 359/819, 822, 823

(56) References Cited

U.S. PATENT DOCUMENTS

| | | | |
|---|---|---|---|
| 1,688,441 A * | 10/1928 | Stewart | 396/529 |
| 2,245,241 A * | 6/1941 | Wood | 396/533 |
| 2,532,300 A * | 12/1950 | Harvey | 396/533 |
| 2,691,322 A * | 10/1954 | Wittel | 396/529 X |
| 2,756,633 A * | 7/1956 | Brandes et al. | 396/529 |
| 2,863,358 A * | 12/1958 | Czarnikow | 396/533 |
| 3,620,149 A * | 11/1971 | Ogihara | 396/533 |
| 3,641,892 A * | 2/1972 | Strehle | 396/529 |
| 4,168,897 A * | 9/1979 | Gates | 396/529 |
| 4,433,907 A * | 2/1984 | Tarsia | 396/529 X |
| 4,466,019 A * | 8/1984 | Sakashita | 396/529 |
| 5,719,712 A * | 2/1998 | Ishikawa | 359/822 X |
| 5,754,350 A * | 5/1998 | Sato | 396/529 |
| 6,469,839 B2 * | 10/2002 | Agata | 359/823 X |

FOREIGN PATENT DOCUMENTS

JP          54103021    *  8/1979    .................. 396/529

* cited by examiner

Primary Examiner—David Bochna
(74) Attorney, Agent, or Firm—Robert J. Depke; Trexler, Bushnell, Giangiorgi, Blackstone & Marr, Ltd.

(57) ABSTRACT

An optical part linkage device in which a threaded portion and positioning protrusions are formed at the outer periphery of a lens barrel that holds a lens. A threaded portion that can be screwed to the threaded portion of the lens barrel is provided at the inner wall surface of the holder to which a CCD package is mounted, with a plurality of positioning recesses being formed at an end of the threaded portion of the holder. After rotating a grip portion of the lens barrel in order to link the lens barrel to the holder by the threaded portions, the grip portion is turned bit by bit in order to position the protrusions with respect to the recesses by shifting them one at a time. When the rotation of the grip portion is stopped in correspondence with an optimal focal location, the protrusions engage the recesses of the holder. In this state, the protrusions do not separate from the recesses of the holder unless a strong force is applied thereto, so that the state of engagement is maintained. The invention provides a low-cost optical part linkage device that allows the positional relationship of two optical parts to be easily and precisely fixed using a simple structure.

9 Claims, 4 Drawing Sheets

OPTICAL PART LINKAGE DEVICE AND OPTICAL MODULE USING THE SAME

RELATED APPLICATION DATA

The present application claims priority to Japanese Application No. P2000-247053 filed Aug. 16, 2000, which application is incorporated herein by reference to the extent permitted by law.

BACKGROUND OF THE INVENTION

1. Field of the Invention

The present invention relates to an optical part linkage device that is formed by linking two parts, each of which holds an optical device, through a threaded mechanism, and an optical module using the optical part linkage device.

2. Description of the Related Art

For example, in an image pickup optical system, such as a camera system, a lens barrel that holds an image-forming device (lens) and a holder that holds an image pickup device, such as a CCD (charge coupled device), are provided as separate parts, and the lens barrel and the holder are constructed so that they are linked by a threaded mechanism in order to position the lens of the lens barrel (that is, adjust the location of the focus) by the threaded mechanism. After the location of the focus is adjusted, the lens barrel is positioned with respect to the holder in order to fix the location of the lens. Hitherto, the lens barrel and the holder have been secured by using an adhesive or a spring washer.

However, in the methods of securing the lens using an adhesive and a spring washer, when a threaded section is loose (that is, when an external thread and an internal thread are loose with respect to each other), a shift occurs from the focal location during bonding with an adhesive. Therefore, there may be cases where the location of the focus cannot be adjusted with proper precision. In the method of securing the lens using an adhesive, the step of hardening the adhesive (including UV (ultraviolet) illumination) and the like need to be carried out, thereby resulting in the problem of increased costs.

SUMMARY OF THE INVENTION

The present invention has been achieved in view of such problems, and has as its object the provision of a low-cost optical part linkage device that allows the positional relationship between two optical parts to be fixed easily and precisely using a simple structure, and an optical module using the optical part linkage device.

According to one aspect of the present invention, there is provided an optical part linkage device for linking a first part and a second part, the first part including a threaded portion and holding an optical device, and the second part including a threaded portion that is screwable to the threaded portion of the first part and holding an optical device that forms a pair with the optical device held by the first part. The optical part linkage device comprises a positioning recess that is formed in either one of the first part and the second part, and a positioning protrusion that is formed at either of the other of the first part and the second part, the positioning protrusion being selectively engageable with the recess.

According to another aspect of the present invention, there is provided an optical module including a linkage structure for linking a first part and a second part, the first part including a threaded portion and holding an image-forming device, and the second part including a threaded portion screwable to the threaded portion of the first part and holding an image pickup device. The optical module comprises a positioning recess that is formed in either one of the first part and the second part, and a positioning protrusion that is formed at either of the other of the first part and the second part, the positioning protrusion being selectively engageable with the recess.

In the optical part linkage device and the optical module using the optical part linkage device of the present invention, by a rotating operation, the first part and the second part are first linked by the threaded mechanism, after which, by the engagement of the positioning recess and protrusion, they are selectively positioned and secured.

DESCRIPTION OF THE PREFERRED EMBODIMENT

Hereunder, a description of an embodiment of the present invention will be given in detail with reference to the relevant drawings.

Figure 1:
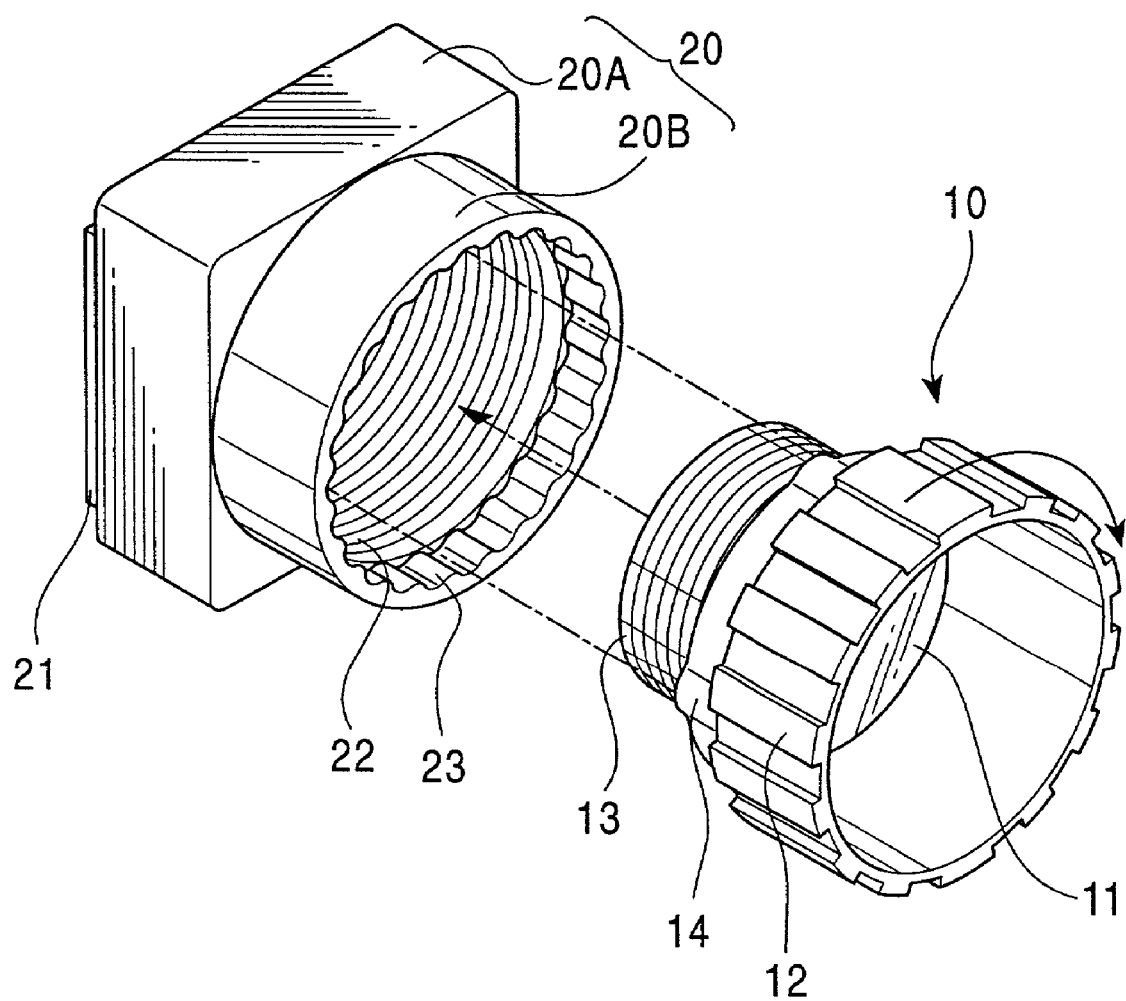
FIG. 1 is an exploded perspective view showing the structure of an embodiment of an optical part linkage device in accordance with the present invention.
Figure 2:
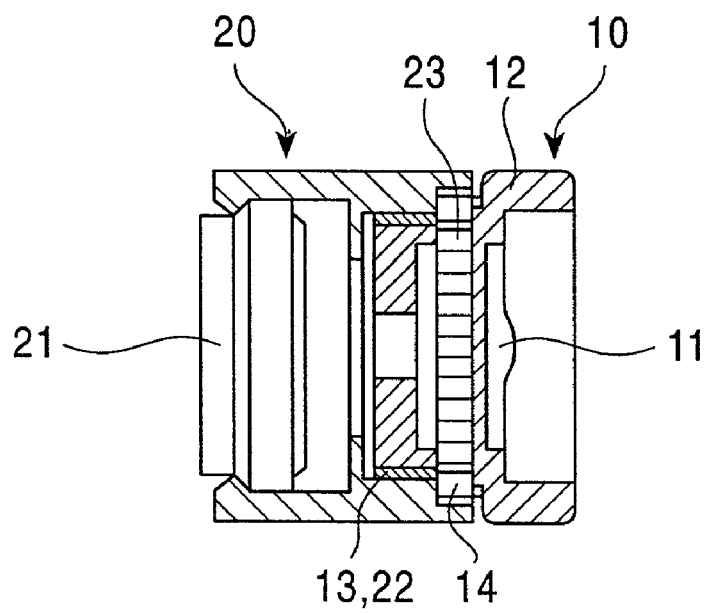
FIG. 2 is a sectional view of the structure of the optical part linkage device shown in FIG. 1.
Figure 3:
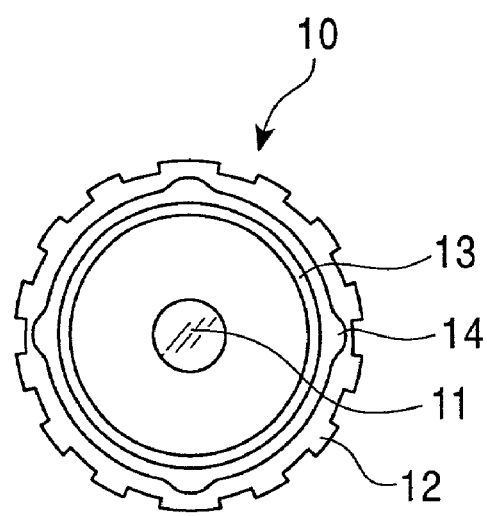
FIG. 3 is a front view of the structure of a lens barrel of the optical part linkage device shown in FIG. 1.
Figure 4:
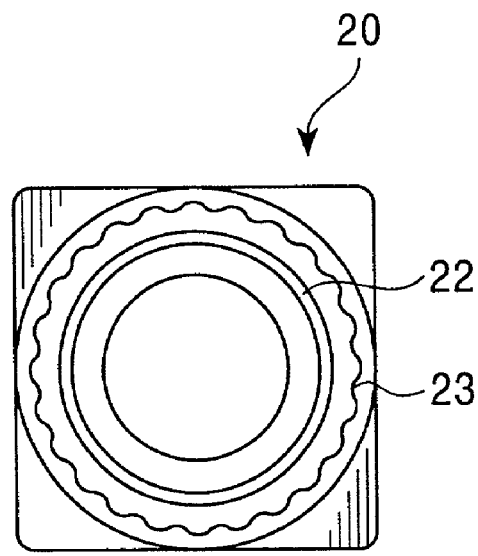
FIG. 4 is a front view of the structure of a holder of the optical part linkage device shown in FIG. 1.

FIG. 1 is an exploded perspective view of an embodiment of an optical part linkage device for a camera module in accordance with the present invention. FIG. 2 is a sectional view of the structure of the optical part linkage device after the linkage of optical parts. FIG. 3 illustrates the structure of a lens barrel of the optical part linkage device. FIG. 4 illustrates the structure of a holder of the optical part linkage device.

The optical part linkage device comprises two parts, that is, a lens barrel 10, serving as a first part, and a holder 20, serving as a second part. The lens barrel 10 and the holder 20 are formed of, for example, PC (polycarbonate) in which glass powder for providing desired hardnesses thereto is mixed. The lens barrel 10 holds a lens 11 in the inside thereof. At the external periphery of the lens barrel 10 are formed a grip portion 12 that is rough so that the hand of an operator does not slide during operation thereof, a threaded portion 13 (such as an external thread) for linkage with the holder 20, and protrusions 14 used for positioning. For example, four protrusions 14 are provided at equal intervals along the same circumference at the termination end of the threaded portion 13.

On the other hand, the holder 20 comprises, for example, a box-shaped image pickup device mounting portion 20A and a cylindrical lens barrel mounting portion 20B. For example, a CCD (charge coupled device) package 21 that incorporates a CCD (charge coupled device) is removably mounted to the image pickup device mounting portion 20A.

A threaded portion 22 (such as an internal thread) that can be screwed to the threaded portion 13 of the lens barrel 10 is provided at the inner wall surface of the lens barrel mounting portion 20B. A plurality of positioning recesses 23 are provided in the end of the threaded portion 22. The plurality of recesses 23 are, for example, continuously formed at equal intervals on the same circumference of the inner wall surface of the lens barrel mounting portion 20B.

In the optical part linkage device of the embodiment, the lens barrel 10 that holds the lens 11 is secured in the following way to the holder 20 that holds the CCD package 21 while the location of the focus is adjusted.

By screwing the threaded portion 13 (external thread) to the threaded portion 22 (internal thread) as a result of holding and turning the grip portion 12 of the lens barrel 10, the lens barrel 10 is linked to the holder 20. When the state of screwing of the threaded portion 22 and the threaded portion 13 is such that they are near their final screwing location, the protrusions 14 of the lens barrel 10 start to engage the recesses 23 of the holder 20, so that a slight resistance is produced during the rotation. At this stage, the location of the focus is subjected to fine adjustment. More specifically, the grip portion 12 of the lens barrel 10 is turned bit by bit by applying additional force thereto in order to position the protrusions 14 of the lens barrel 10 with respect to the recesses 23 (provided on the entire circumference of the holder 20) while shifting them one at a time. When the optimal focal location is reached, and the rotation of the grip portion 12 is stopped, the protrusions 14 of the lens barrel 10 are in an engaged state with respect to the recesses 23 of the holder 20. In this state, in particular, the protrusions 14 do not separate from the recesses 23 unless a strong force is applied thereto, so that the state of engagement is maintained. By such an operation, the lens barrel 10 that holds the lens 11 can be secured to the holder 20 that holds the CCD package 21 with sufficient strength while the focal location is adjusted. The lens barrel 10 can be secured to the holder 20 with even greater strength using an adhesive.

The pitch for adjusting the location of the focus (focus adjustment pitch) is determined by the pitch (engagement pitch) between the recesses 23 and the protrusions 14 in addition to the diameter (inside diameter) of the lens barrel 10 and the pitches of the threaded portions 13 and 22. However, in order to increase the precision with which the adjustment is carried out, the number of recesses 23 is increased as a result of making the sizes of the protrusions 14 small so as to decrease the engagement pitch between the recesses 23 and the protrusions 14.

Figure 5:
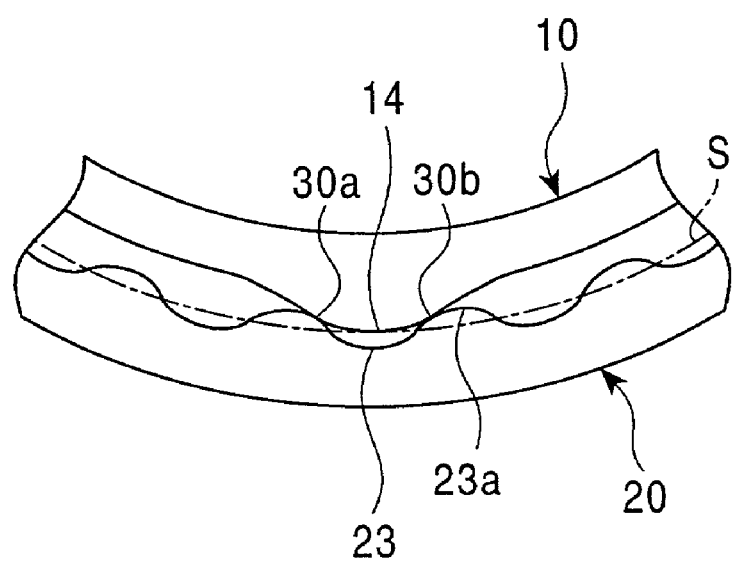
FIG. 5 is a partial enlarged view of a state in which protrusions of the lens barrel and recesses of the holder of the optical part linkage device shown in FIG. 1 are positioned.

FIG. 5 is a partial enlarged view of the state of engagement of the recesses 23 of the holder 20 and the protrusions 14 of the lens barrel 20. An apex of each protruding portion 23a adjacent to its corresponding recess 23 of the holder 20 is formed so as to be located inwardly of a circumference S that connects the apices of the plurality of protrusions 14 of the lens barrel 10 (that is, towards the center of the circle). This makes it possible to maintain the state of engagement between the recesses 23 of the holder 20 and the protrusions 14 of the lens barrel 10 with a certain amount of strength. However, when each protruding portion 23a of the holder 20 protrudes excessively inward from the circumference S, each corresponding protrusion 14 of the lens barrel 10 gets caught by the corresponding recess 23, so that the grip portion 12 of the lens barrel 10 can no longer be rotated. Therefore, it is necessary to form each of them with the proper size. Since the recesses 23 of the holder 20 and the protrusions 14 of the lens barrel 14 contact at corresponding two points, it is necessary to form the regions near corresponding point contact portions 30a and 30b with a certain smoothness.

In the embodiment, by engaging the recesses 23 and the protrusions 14 after linking the lens barrel 10 to the holder 20 by the threaded mechanism (the threaded portions 13 and 22), the lens barrel 10 is positioned at and secured to the holder 20 while the location of the focus is adjusted. Therefore, it is possible to reliably and precisely secure the lens barrel 10 with sufficient strength without securing it with an adhesive. In addition, since an adhesive is virtually not required, it is possible to eliminate shifts after adjusting the location of the focus caused by the bonding step, and to make it unnecessary to carry out a hardening step, such as UV (ultraviolet) illumination or the like. Therefore, it is possible to reduce costs as a result of reduced process tact.

Even when the lens barrel 10 is secured with an adhesive to secure it with even greater strength after adjusting the location of the focus, it is secured with sufficient strength due to the engagement of the recesses 23 of the holder 20 and the protrusions 14 of the lens barrel 10. Therefore, positional shifts do not occur during the bonding step, and, after the lens barrel 10 has been secured to the holder 20, shifts in the focal location due to rattling do not occur. In addition, since it is not necessary to use an adhesive having high adhesive force, it is possible to use an adhesive that is suitable for the materials of the holder 20 and the lens barrel 10.

Figure 6:
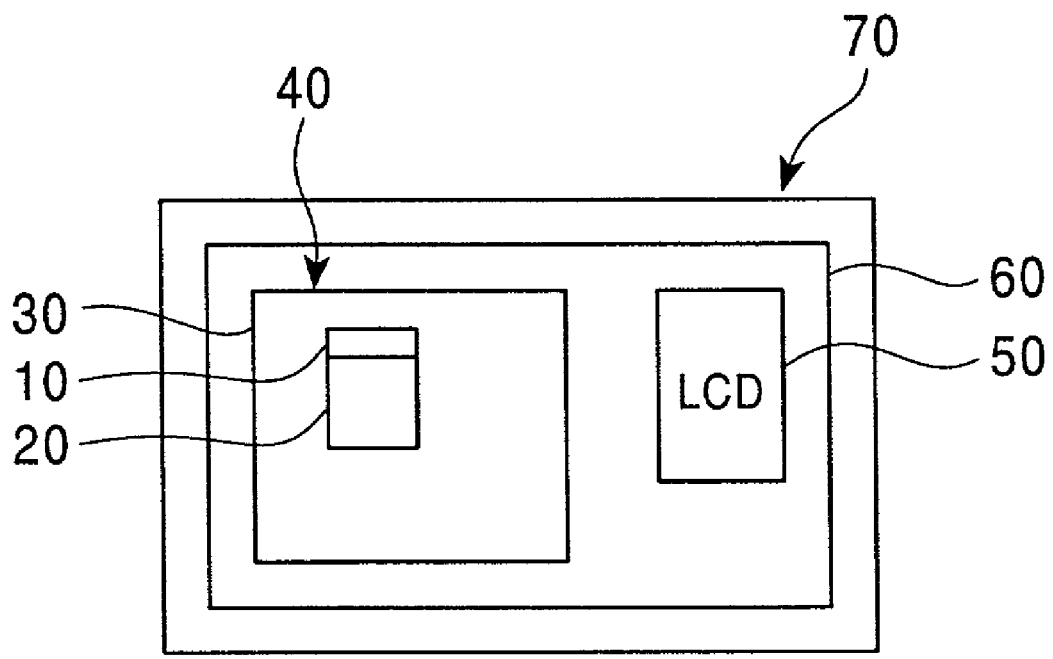
FIG. 6 is a simplified view of an example of an image pickup optical system using an image pickup optical module including the optical part linkage device shown in FIG. 1.

FIG. 6 is an example of an image pickup optical system using the camera module including the optical part linkage device. The holder 20 that includes the CCD package 21 is mounted to an electronic circuit board 30, and the lens barrel 10 that includes the lens 11 is secured to the holder 20 in order to form a camera module 40. The holder 20 may be directly mounted to the electronic circuit board 30 as described above, or it may be electrically connected through wires. By mounting the camera module 40 to a board 60 along with, for example, an LCD (liquid crystal display) 50, an image pickup optical system 70 is formed. An example of the image pickup optical system 70 is a camera system such as a small digital camera.

Although the present invention has been described with reference to an embodiment, the present invention is not limited to the above-described embodiment, so that various modifications are possible. For example, although in the embodiment the recesses 23 are formed in the holder 20 and the protrusions 14 are formed on the lens barrel 10, the protrusions 14 may be formed on the holder 20 and the recesses 23 may be formed in the lens barrel 10. It goes without saying that the number of protrusions 14 and the number of recesses 23 are not limited to those in the embodiment. Further, although in the embodiment the case where the recesses 23 are formed along the entire circumference of the holder 20 is taken as an example, the recesses 23 do not necessarily have to be formed on the entire circumference, so that they may be intermittently formed in portions of the circumference.

Although in the above-described embodiment the case where the first part is the lens barrel 10 including an optical image-forming device (the lens 11) and the second part is the holder 20 including an image pickup device (the CCD package 21) is taken as an example, the image pickup device may be formed using a CMOS (complementary metal oxide semiconductor) sensor. In addition, for example, the first part may include a laser device and the second part may include a sensor for receiving light beams that have exited from the laser device. The point is that as long as the structure used links the two optical parts, it may be used in either system.

As can be understood from the foregoing description, according to the optical part linkage device and the optical module of the present invention, the first and second parts include positioning protrusions and recesses, respectively, in addition to threaded portions, and are positioned and secured by engagement of the recesses and the protrusions. Therefore, using a simple structure, the two parts can be reliably and precisely secured with sufficient strength, and, for example, the focal location can also be precisely adjusted.

What is claimed is:

1. An optical linkage device for securing a first part and a second part, the first part including a first threaded portion, and the second part including a second threaded portion that is screwable to the first threaded portion, wherein the first part and the second part may be comprised of a lens member or a body housing imaging elements, including either of a CCD sensor or a CMOS sensor, the optical linkage device comprising:
   a plurality of positioning recesses that are formed at a circumference of the first part such that a plurality of said recesses are located in a one-fourth portion of the circumference;
   a plurality of positioning protrusions that are formed in the second part, the positioning protrusion being selectively engageable with the recess members when threading the first part onto the second part wherein said recesses and said protrusion are rounded; and
   a means for securing the first part and the second part in a permanent fixed relationship,
   wherein all of said plurality of positioning protrusions are positioned in some of said plurality of positioning recesses when the first part and the second part are fixed to each other.

2. An optical linkage device according to claim 1, wherein the first threaded portion is an external thread, and the second part is further comprised of two or more positioning protrusions.

3. An optical linkage device according to claim 2, wherein the second threaded portion is an internal thread.

4. An optical linkage device according to claim 1, wherein the first part is a lens barrel.

5. An optical linkage device according to claim 4, wherein the second part is a holder for holding the lens barrel, and further wherein an image pickup device is mounted to the holder.

6. An optical linkage device according to claim 5, wherein, by selecting a location of engagement for the recess and the protrusion, a desired focal location between the image pickup device and the lens is achieved.

7. An optical linkage device according to claim 5, wherein an image-forming-device focus adjustment pitch is determined at least in part by an engagement pitch between the recess and the protrusion elements.

8. An optical linkage device for securing a first part and a second part, the first part including a first threaded portion, and the second part including a second threaded portion that is screwable to the first threaded portion, wherein the first part and the second part may be comprised of a lens member or a body housing imaging elements, including either of a CCD sensor or a CMOS sensor, the optical linkage device comprising:
   a plurality of positioning recesses that are formed at a circumference of the first part such that a plurality of said recesses are located in a one-fourth portion of the circumference;
   a plurality of positioning protrusions that are formed in the second part, the positioning protrusion being selectively engageable with the recess members when threading the first part onto the second part wherein said recesses and said protrusion are rounded; and
   wherein the threaded portion of the first part or the second part passes through a plane in which the positioning protrusion engages the recess members during assembly,
   wherein all of said plurality of positioning protrusions are positioned in some of said plurality of positioning recesses when the first part and the second part are fixed to each other.

9. An optical linkage device for securing a first part and a second part, the first part including a first threaded portion, and the second part including a second threaded portion that is screwable to the first threaded portion, wherein the first part and the second part may be comprised of a lens member or a body housing CMOS sensor, the optical linkage device comprising:
   a plurality of positioning recesses that are formed at the first part;
   a plurality of positioning protrusions that are formed at the second part, the positioning protrusion being selectively engageable with one of said plurality of positioning recesses; and
   wherein all of said plurality of positioning protrusions are positioned in some of said plurality of positioning recesses when the first part and the second part are fixed each other.

* * * * *